Sept. 1, 1925.  1,552,384
C. MACMILLAN
ASYNCHRONOUS MOTOR
Filed June 7, 1922
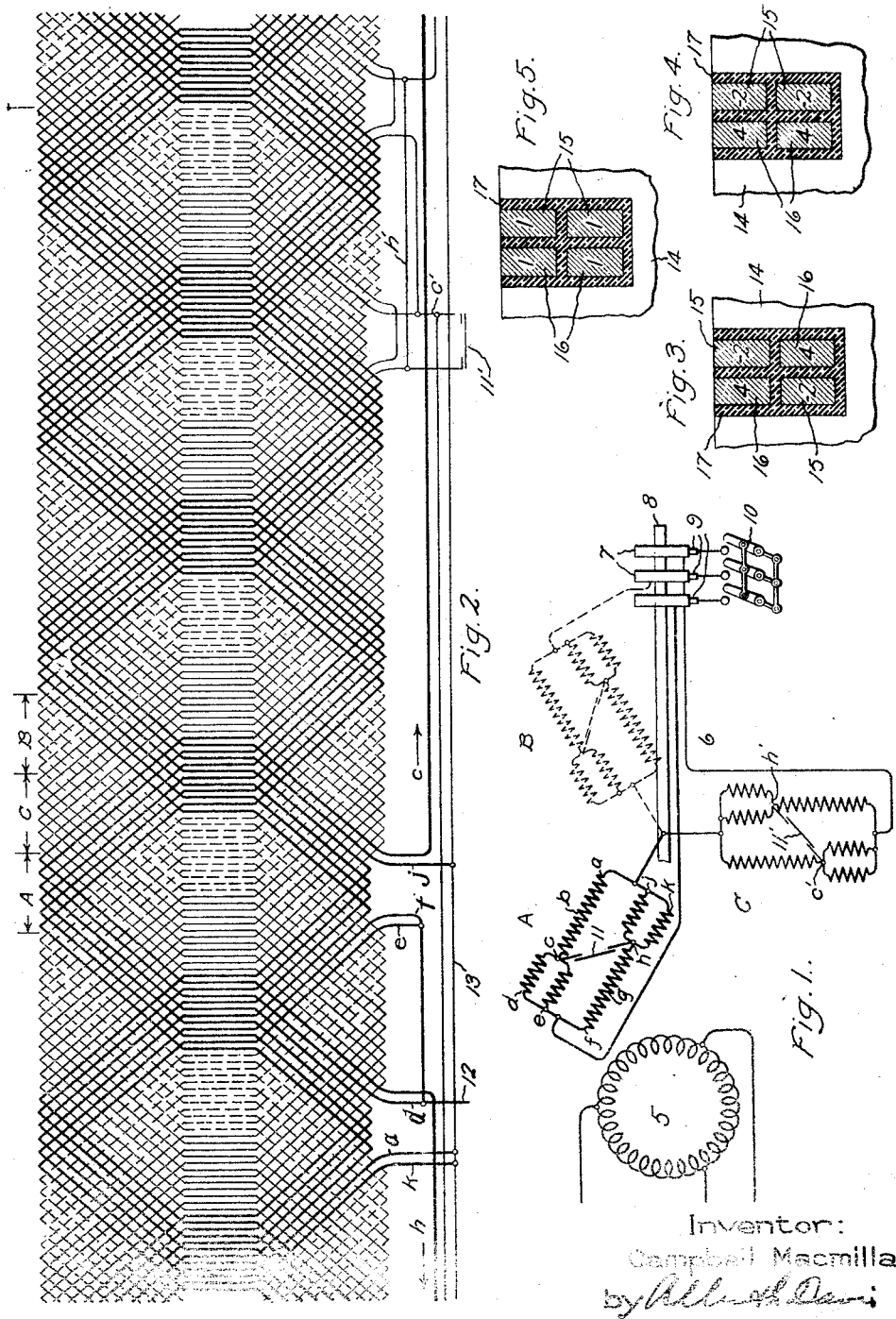
Inventor:
Campbell Macmillan
by ............
His Attorney.

Patented Sept. 1, 1925.

1,552,384

UNITED STATES PATENT OFFICE.

CAMPBELL MACMILLAN, OF SCHENECTADY, NEW YORK, ASSIGNOR TO GENERAL ELECTRIC COMPANY, A CORPORATION OF NEW YORK.

ASYNCHRONOUS MOTOR.

Application filed June 7, 1922. Serial No. 566,552.

*To all whom it may concern:*

Be it known that I, CAMPBELL MACMILLAN, a citizen of the United States, residing at Schenectady, in the county of Schenectady, State of New York, have invented certain new and useful Improvements in Asynchronous Motors, of which the following is a specification.

My invention relates to alternating current dynamo electric machines and more particularly to the secondary members of alternating current motors of the asynchronous type.

The principal object of my invention is to provide a motor having the desirable starting torque and running efficiency of the wound rotor type induction motor without the necessity of providing the external starting resistance or complicated brush gear mechanism commonly used with such motors.

My invention contemplates improvements in the type of induction motor rotor described in Görges U. S. Patent 655,340. The most important novel feature of the present invention consists in the arrangement of the secondary winding so as to preserve complete electrical symmetry and at the same time avoid any increase in reactance over the usual external resistance connected secondary.

In carrying my invention into effect I provide a wound secondary connected to a short circuiting device, which secondary is so wound that with the short circuit removed, relatively large currents are caused to flow in local low inductance, high resistance circuits in the secondary windings, whereby high starting torque is obtained and when the windings of the secondary are short circuited the effect produced is similar to the effect produced by short circuiting the usual external starting resistance of the ordinary wound rotor induction motor whereby efficient running conditions are obtained. The rotor winding constituting the subject of the present application is especially applicable for slow speed motors with large starting and reversing torque such, for example, as those used to drive the propellers of an electrically driven ship where it is desirable to keep the weight and space required for the motor equipment as low as possible. The rotor winding consists essentially of a normal definite winding preferably connected to slip rings when the secondary forms the rotating element of the motor as is usual. The rotor windings have unequal parallel paths in each phase. When the slip rings are open a circulating current is forced backward through the low voltage circuits by the high voltage circuits, so that with a comparatively small net current per slot the current density in each conductor is considerably larger than usual due to the large currents flowing in opposite directions in the same slot the difference of which gives the net effective secondary current. When the rotor has been brought up to speed the slip rings are short circuited which causes the currents in the two parallel circuits per phase to flow in the same direction so that with this connection the effective slot current is the sum of the currents flowing in each conductor.

The features of my invention which I believe to be novel and patentable will be pointed out in the claims appended hereto. The preferred construction and the theory of operation of a motor built in accordance with my invention will be described in connection with the accompanying drawing in which: Fig. 1 illustrates a schematic diagram of the essential circuits of the motor; Fig. 2 illustrates a portion of the rotor circuit wiring diagram; Figs. 3 and 4 illustrate the current distribution for alternative arrangements of the conductors per slot during the starting period; and Fig. 5 illustrates the distribution of current per slot during normal running conditions.

Referring first to Fig. 1, 5 represents the usual primary winding of a 3-phase induction motor connected delta in this instance. The secondary winding is designated in general by the numeral 6 having three phases designated by the reference letters A, B and C, phase A being represented by heavy lines, B by broken lines and C by light lines in order that said phases may be more easily traced in Fig. 2. The three phases of the rotor are shown connected Y with the outer points connected to slip rings 7 mounted on the rotor shaft 8. The slip rings 7 are arranged to be short circuited through stationary brushes 9 and the short circuiting switch 10. The diagram for each rotor phase as illustrated in Fig. 1 may be taken to represent the arrangement of 8 bars in two slots. A removable connector 11 constitutes a normally closed end connection between the series and parallel connected coils of each phase.

The critical points which require reference and explanation are represented by the small letters from $a$ to $k$ in phase A. The effect of equivalent high resistance is obtained in this network when the connector 11 between points $c$ and $h$ is closed. The network then consists of two independent meshes; $a$, $b$, $c$, $(hk)$, $(hj)$, $a$ and $(cd)$, $(ce)$, $f$, $h$, $c$. Confining attention to the first mesh, it will be recognized that the two coils $a\,b$, $b\,c$ in series furnish double the voltage in the opposing coils $h\,j$ and $h\,k$. The surplus due to the difference of these voltages is available for production of circulating current and since the same current is carried by $h\,j$ and $h\,k$ in multiple as is carried by $a\,b$, $b\,c$ in series, the current per coil is half as great in the former case as in the latter. The coils $a\,b$, $b\,c$, $h\,j$ and $h\,k$ are wound in the same slots in such a way that when the slip ring short circuit is open the current in the series connected coils at any instant flows in the opposite direction to that in the parallel connected coils. The net current is available in the slot therefore consists of the difference between two currents of full value carried in one direction by coils $a\,b$, $b\,c$ and two currents in the opposite direction of half value carried by the coils $h\,j$, $h\,k$. This provides the disposition of current and voltage described in detail in connection with Figs. 3 and 4. Each of the two independent meshes of the three phases A, B and C are similarly connected and arranged in the slots of the rotor. When the rotor is short circuited by closing the switch 10 current in the series coils $a\,b$, $b\,c$ and the current in the parallel coils $h\,k$ and $h\,j$ now flow in the same direction in the slots at any instant so that now the effective current per slot is the sum of the current in each of these coils.

In the wiring diagram as given in Fig. 2 and the cross section of the slot conductors as given in Figs. 3, 4 and 5, each slot contains four bar conductors. The wiring diagram of Fig. 2 represents the development of $5\frac{1}{3}$ poles of the rotor winding of a 3-phase, 16-pole motor. This motor has 144 slots with four conductors per slot, the conductors of the three phases being indicated respectively by the heavy, broken and light lines as in Fig. 1. 12 indicates the slip ring connection for phase A and 13 the Y end connection. The points of the winding referred to in Fig. 1 are indicated by the same reference characters in Fig. 2, the points $a$, $d$, $e$, $f$, $j$ and $k$ being shown for phase A and the points $c'$ and $h'$ and connector 11' for phase C. The points referred to as $b$ and $g$ on Fig. 1 merely indicate the centers of coils the length of which is twice that of the parallel connected coils. Consequently these points are not indicated in Fig. 2. In the winding shown one series and one multiple bar lie side by side in the bottom of the slot with a similar pair above, the series bars on one side and the multiple bars on the other. This is illustrated in Fig. 4 where 14 represents the secondary laminations, 15 the bars of the parallel connected windings and 16 the bars of the series connected windings. These bar conductors are insulated from each other as indicated at 17. The numbers and signs appearing in the center of each bar in Figs. 3, 4 and 5 represent the comparative current distribution and direction of flow in said bars under different conditions. Thus in Fig. 4 the effective current per slot is $4+4-2-2=4$, but the $I^2R$ loss produced by this current is $(16+16+4+4)\,R=40R$. A further decrease in inductance during the starting period may be obtained by interchanging series and multiple bars in one layer of the winding as illustrated in Fig. 3. Thus it will be apparent that the reluctance path available in the arrangement of Fig. 4 is shorter in unit length per ampere conductor enclosed than in Fig. 3. This low inductance effect may be obtained in a wave winding by introducing a difference of one slot pitch between the winding pitches at the two ends of the rotor. This advantage may be partially offset, or more than offset, by the overlapping of adjacent phase belts in the two layers of windings so that the feasibility of this modification will depend on the detail design in each individual case; the advantages gained are insufficient to warrant its adoption as a preferable method in the design of the motor having a number of poles, phases and conductors per slot hereinbefore described. The arrangement shown in Fig. 3, together with the parallel arrangement of the conductors carrying equal but opposite current in the end connections as clearly shown in Fig. 2, preserves what I term "complete electrical symmetry." When the switch 10 is closed the relative current distribution and direction of current flow to give the same effective current per slot as in Figs. 3 and 4 is represented in Fig. 5. Here the current in each bar flows in the same direction through the slot at any instant and each bar carries substantially the same amount of current because now the current may be considered to flow from the Y point to the slip rings and will distribute itself according to the impedance and induced voltage of the various circuits per phase. An equalizing current approximately equal to that flowing in each bar will cross through the connectors 11. In Fig. 5 the effective current per slot is the same as in Figs. 3 and 4 but the $I^2R$ loss is only $(1+1+1+1)\,R=4R$, which is only 1/10th of the I²R loss for the same effective current per slot as with the slip rings 9 open circuited.

In operation, the external resistance motor is started with full line voltage or from an autotransformer or compensator with the slip rings open circuited. When full speed is attained the slip ring circuits are closed by contactors or switches. No external rheostats are required with this motor since the rotor winding gives the equivalent high resistance at starting, which resistance is reduced to normal when the slip rings are short circuited. The inductance of the rotor during the starting operation is low due to the fact that conductors carrying current in opposite directions are placed side by side and this arrangement is continued in the end connections so far as is practicable.

Due to the large energy loss in the rotor of my improved motor at starting, it becomes important to design the rotor so as to withstand and dissipate the heat generated therein. The insulation 17 should be capable of withstanding high temperatures and should also be a good heat conductor. It may often be desirable to use forced ventilation during the starting period. It may be stated, however, that if the insulation 17 should burn through, the resulting short circuit between bars would simply reduce the available starting torque and would not interfere with the normal operation of the motor.

The purpose of the removable connectors 11 is so that this cross connection may be opened up in order to use the rotor with an external resistance for starting purposes in the ordinary way should it become desirable. With the connectors 11 removed, the motor may be started up by the use of the ordinary external resistance connected to the slip rings and when the rotor is up to speed, the slip rings may be short circuited in the usual way for normal operation. As thus used, the current distribution per slot would be unequal. The current in the parallel and series coils would be in the ratio of two-thirds to four-thirds, giving a slight increase in the energy dissipation during normal operation. In any case where it becomes desirable to operate the motor in this manner the full efficiency of uniform current density may be obtained by making the sections of the series and multiple bars proportional to the current which they will be called upon to carry. By the full efficiency of uniform current density, I refer to the well known fact that if a specified total current is carried in the specific number of multiple circuits of equal length with a specified total cross sectional area of conductor, that distribution of current, which gives minimum resistance losses is obtained when the current densities in the various multiple circuits are equal. There is no imperative reason why these bars need have the same crosssectional dimensions. Other relations between these dimensions furnish a simple means for obtaining minor variations of the equivalent high resistance as desired. With the connectors 11 removed, the motor may also be run inverted; that is to say, with the stator shortcircuited and the generator lines connected to the brush leads. Since the connectors 11 are arranged in the end connection they may be removed without dismantling the rotor.

The winding connections for motors built in accordance with this invention are not applicable to all combinations of poles and circuits but can generally be applied where the number of circuits is not very small. There must always be at least two conductors per slot. I therefore do not wish to be limited to the particular arrangement of the circuits described, but intended to cover in the appended claims all modifications coming fairly within the scope of my invention. For example, instead of the unit group of 8 conductors selected for description on account of its relative simplicity, other unit groups may be used consisting of numbers having suitable factors. Thus in a unit group of 24 conductors in two circuits of 12 coils each, these 12 coils might be segregated in sub-groups of which the first would have 3 multiple 4 series and the second 4 multiple 3 series. The result is in every case to give an effective current per slot proportional to the difference in current per circuit. The energy dissipating effect, on the other hand, remains proportional to the sum of these currents, the total losses in the two cases being proportional to the squares of these values. The ratio of current per circuit is obtained as the reciprocal of the number of multiple circuits in the respective groups.

What I claim as new and desire to secure by Letters Patent of the United States, is:

1. In an alternating current motor, the combination with a field portion, of an armature therefor having a multiphase winding comprising an even number of divisions for each phase, each of said divisions comprising a pair of parallel coils connected in series with a longer coil, the parallel coils of one division and the longer coil of another division being connected in local short circuits and means for interconnecting said phases to form a closed, electrically symmetrical phase wound winding.

2. In an alternating current induction motor, a secondary member having a multiphase winding comprising an even number of equal divisions, each division having two relatively short coils in multiple and a longer coil in series, said divisions being interconnected so as to form a plurality of local short circuits each comprising the two multiple coils of one division in series with the longer coil of a different division and means for changing the connections of said phases to vary the effective resistance of said secondary.

3. In an alternating current motor the combination with a field portion, of an armature therefor having a multiphase winding and having an even number of equal divisions, unequal portions of different divisions being connected in local short circuits and means for connecting said different divisions in parallel.

4. In an alternating current motor, the combination with a primary, of a secondary therefor having a multiphase winding provided with a pair of equal circuits per phase, unequal portions of each pair being connected in voltage opposition and means for connecting said pairs of circuits in multiple.

5. A secondary member for a motor of the induction type comprising an electrically symmetrical multiphase winding situated in slots, said winding comprising an even number of equal divisions having unequal portions of different divisions interconnected to form low inductance short circuits situated in the same slots and means for connecting said interconnected divisions in parallel.

6. An induction motor secondary of the phase wound type having unequal coil sections connected in opposition for producing a high internal resistance for starting purposes and having means for connecting said coil sections in parallel to decrease the internal resistance of the secondary for running purposes, characterized by the fact that the opposing coil sections in the starting connection have an unequal number of circuits and are distributed in slots in such a way that the effective starting current per slot is the difference between the currents carried by an equal number of opposing circuits.

7. An induction motor secondary of the phase wound type having unequal coil sections connected in opposition for producing a high internal resistance for starting purposes and having means for connecting said coil sections in parallel to decrease the internal resistance of the secondary for running purposes, characterized by the fact that the opposing coil sections in the starting connection have an unequal number of coils in series and are distributed in slots in such a way that the effective starting current per slot is the difference between the currents carried by an equal number of opposing circuits and the effective running current per slot is the sum of the currents carried by said circuits.

8. An induction motor comprising cooperating primary and secondary members, said secondary member being phase wound and of the type having connections to convert the same from a low inductance, high internal resistance secondary to a low internal resistance secondary, the high internal resistance effect being possible by reason of connections between electrically unequal portions of normally parallel circuits in said secondary winding, characterized by a secondary coil arrangement such that complete electrical symmetry as regards magnetic distribution is retained whereby the motor may be used inverted without modification of the flux wave form of flux distribution when the connections between the electrically unequal portions of the normally parallel circuits are removed.

In witness whereof, I have hereunto set my hand this 6th day of June, 1922.

CAMPBELL MACMILLAN.